(12) United States Patent
Tsiberidis

(10) Patent No.: US 11,413,913 B2
(45) Date of Patent: Aug. 16, 2022

(54) COMPRESSOR ASSEMBLY COMPRISING A BEADED CYLINDRICAL CAM

(71) Applicants: ILLINOIS TOOL WORKS INC., Glenview, IL (US); KT PROJEKTENTWICKLUNGS-GMBH, Heilbronn (DE)

(72) Inventor: Konstantin Tsiberidis, Untergruppenbach (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 269 days.

(21) Appl. No.: 16/462,825

(22) PCT Filed: Nov. 24, 2017

(86) PCT No.: PCT/EP2017/080390
§ 371 (c)(1),
(2) Date: May 21, 2019

(87) PCT Pub. No.: WO2018/096111
PCT Pub. Date: May 31, 2018

(65) Prior Publication Data
US 2020/0055351 A1 Feb. 20, 2020

(30) Foreign Application Priority Data
Nov. 24, 2017 (DE) ...................... 10 2016 122 739.0

(51) Int. Cl.
*B60C 23/12* (2006.01)
*B60C 23/00* (2006.01)
(Continued)

(52) U.S. Cl.
CPC .......... *B60C 23/127* (2020.05); *B60C 23/004* (2013.01); *B60C 23/137* (2020.05);
(Continued)

(58) Field of Classification Search
CPC ... B60C 23/127; B60C 23/137; B60C 23/004; F04C 9/00; F04C 15/0061; F04B 1/0413;
(Continued)

(56) References Cited

U.S. PATENT DOCUMENTS 648,408 A 5/1900 Hayes
652,997 A 7/1900 Crandall
(Continued)

FOREIGN PATENT DOCUMENTS

CA 2226493 7/1996
CN 85105176 A 12/1986
(Continued)

OTHER PUBLICATIONS

European Patent Office (EPO), International Search Report, Form PCT/ISA/210 for International Application No. PCT/EP2017/080390 (2 pages).
(Continued)

*Primary Examiner* — Jason R Bellinger
*Assistant Examiner* — Emily G. Castonguay
(74) *Attorney, Agent, or Firm* — Pauley Erickson & Swanson

(57) ABSTRACT

The invention relates to a compressor assembly for supplying pressure medium to a tire cavity of a vehicle wheel that can be mounted on a wheel hub which can be mounted on a wheel carrier so as to be rotatable about an axis of rotation. The compressor assembly includes a wheel mount-side transmission component or the hub-side transmission component, which includes a cylindrical cam.

23 Claims, 22 Drawing Sheets

(51) Int. Cl.
   *F04C 9/00*     (2006.01)
   *F04C 15/00*    (2006.01)
   *B29C 73/16*    (2006.01)
   *B29L 30/00*    (2006.01)
   *F04B 1/0413*   (2020.01)

(52) U.S. Cl.
   CPC ............ *F04C 9/00* (2013.01); *F04C 15/0061* (2013.01); *B29C 73/166* (2013.01); *B29L 2030/00* (2013.01); *F04B 1/0413* (2013.01)

(58) Field of Classification Search
   CPC ... F04B 1/0417; F04B 1/0426; B29L 2030/00
   See application file for complete search history.

(56) References Cited

U.S. PATENT DOCUMENTS

| | | | |
|---|---|---|---|
| 655,797 A | 8/1900 | Reason | |
| 797,447 A | 8/1905 | Merry | |
| 1,358,524 A | 11/1920 | Cooper | |
| 1,713,899 A | 5/1929 | Gray | |
| 2,317,636 A | 4/1943 | Parker | |
| 2,506,677 A | 5/1950 | McKenna | |
| 5,052,456 A | 10/1991 | Dosjoub | |
| 5,325,902 A * | 7/1994 | Loewe | B60C 23/126 152/419 |
| 5,505,080 A | 4/1996 | McGhee | |
| 6,345,650 B1 | 2/2002 | Paasch et al. | |
| 6,736,170 B2 | 5/2004 | Eriksen et al. | |
| 6,994,136 B2 | 2/2006 | Stanczak | |
| 7,237,590 B2 | 7/2007 | Loewe | |
| 7,581,576 B2 | 9/2009 | Nakano | |
| 7,760,079 B2 | 7/2010 | Isono | |
| 7,891,393 B1 | 2/2011 | Czarno | |
| 8,052,400 B2 * | 11/2011 | Isono | B60C 23/00318 417/233 |
| 9,151,288 B2 * | 10/2015 | Richardson | B60S 5/043 |
| 9,457,772 B2 | 10/2016 | Paasch | |
| 2003/0056851 A1 | 3/2003 | Eriksen et al. | |
| 2007/0151648 A1 | 7/2007 | Loewe | |
| 2008/0060734 A1 | 3/2008 | Stehle | |
| 2010/0059143 A1 | 3/2010 | Wang | |
| 2010/0282388 A1 | 11/2010 | Kelly | |
| 2013/0251552 A1 | 9/2013 | Richardson | |
| 2013/0269514 A1 | 10/2013 | Sato et al. | |
| 2014/0096881 A1 | 4/2014 | Loewe | |
| 2015/0101723 A1 | 4/2015 | Keeney et al. | |
| 2015/0191058 A1 | 7/2015 | van Wyk Becker et al. | |
| 2016/0250902 A1 | 9/2016 | Becker | |
| 2016/0288591 A1 | 10/2016 | Becker | |
| 2016/0288592 A1 | 10/2016 | Becker | |
| 2017/0113500 A1 * | 4/2017 | Gau | B60C 23/137 |
| 2019/0023091 A1 | 1/2019 | Spindler et al. | |
| 2019/0308472 A1 | 10/2019 | Tsiberidis | |
| 2019/0366785 A1 * | 12/2019 | Tsiberidis | B60C 23/127 |
| 2020/0055351 A1 | 2/2020 | Tsiberidis | |
| 2020/0070450 A1 | 3/2020 | Tsiberidis | |

FOREIGN PATENT DOCUMENTS

| | | |
|---|---|---|
| CN | 86105562 A | 2/1988 |
| CN | 2126829 Y | 10/1993 |
| CN | 2188661 Y | 2/1995 |
| CN | 2202665 Y | 7/1995 |
| CN | 2252128 | 4/1997 |
| CN | 101104374 | 1/2008 |
| CN | 101120170 A | 2/2008 |
| CN | 201061989 Y | 5/2008 |
| CN | 201082666 | 7/2008 |
| CN | 101312821 A | 11/2008 |
| CN | 101313162 A | 11/2008 |
| CN | 101351347 A | 1/2009 |
| CN | 101696681 | 4/2010 |
| CN | 202439521 U | 9/2012 |
| CN | 102781653 A | 11/2012 |
| CN | 102791954 A | 11/2012 |
| CN | 103459843 A | 12/2013 |
| CN | 103465736 A | 12/2013 |
| CN | 104024007 A | 9/2014 |
| CN | 104583592 A | 4/2015 |
| CN | 105264228 A | 1/2016 |
| CN | 205044451 U | 2/2016 |
| CN | 105408135 A | 3/2016 |
| DE | 40 36 362 A1 | 5/1992 |
| DE | 41 33 039 A1 | 4/1993 |
| DE | 10 2005 019 766 A1 | 11/2006 |
| DE | 20 2014 010 520 U1 | 12/2015 |
| DE | 10 2015 115642 A1 | 5/2018 |
| EP | 0166123 | 1/1986 |
| EP | 0 588 595 A1 | 3/1994 |
| EP | 1 881 197 A1 | 1/2008 |
| EP | 2 828 103 B1 | 1/2015 |
| FR | 1324352 | 3/1963 |
| JP | H11139118 A | 5/1999 |
| JP | 2004-136797 | 5/2004 |
| JP | 2006-110762 | 4/2006 |
| JP | 2007 039013 A | 2/2007 |
| JP | 2007-278796 | 10/2007 |
| WO | WO 2008/041423 A1 | 4/2008 |
| WO | WO 2010/146373 A1 | 12/2010 |
| WO | WO 2015/063679 A1 | 5/2015 |
| WO | WO 2015/075655 A1 | 5/2015 |
| WO | WO 2016/138972 A1 | 9/2016 |
| WO | WO 2016/178137 A1 | 11/2016 |
| WO | WO 2018/096108 A1 | 5/2018 |
| WO | WO 2018/096109 A1 | 5/2018 |
| WO | WO 2018/096110 A1 | 5/2018 |
| WO | WO 2018/096112 A1 | 5/2018 |

OTHER PUBLICATIONS

Chongfeng Di, "Research on Characteristic and Control Strategy of Hydraulic Hybrid Vehicle with Hydraulic Common Pressure Rail", China Master Dissertation Full-text Database, Jan. 1, 2016, pp. 27-38 and 78-80.

* cited by examiner

COMPRESSOR ASSEMBLY COMPRISING A BEADED CYLINDRICAL CAM

BACKGROUND OF THE INVENTION

Field of the Invention

The invention relates to a compressor assembly for supplying a pressure medium to a tire cavity of a tire.

Discussion of Related Art

The tire cavity of the tire is part of a vehicle tire that can be mounted on a wheel hub, wherein the wheel hub can be mounted on a wheel mount such that it can rotate about an axis of rotation.

In order to inflate a tire cavity of a vehicle tire with a pressure medium, such as compressed air, it is known to provide a tire valve on a vehicle wheel, via which the pressure medium can be introduced into the tire cavity. With vehicles such as passenger cars, trucks or utility vehicles, tire valves are normally located in the vicinity of a wheel rim on which the tire is mounted such that they are readily accessible from the outside.

An external pressure medium source can be connected to the tire valve by means of a hose in order to thus be able to control, and potentially correct, the tire pressure, in particularly manually.

Vehicle-side pressure medium supply systems are also known that enable an autonomous inflation of the tire cavity in a vehicle tire with a pressure medium. For this, it is known to provide pressure medium lines to the wheels from a central pressure medium source on the vehicle, e.g. a compressor or a pressure accumulator, that lead into the tire cavity. In the transition from non-rotating components on the vehicle, e.g. the wheel mount, to the wheels that rotate when the vehicle is in operation, so-called rotary feedthroughs are implemented, which also enable an inflation with the pressure medium while driving, i.e. when the wheels are turning. In this manner, the tire pressure can be adjusted to changes in loads, driving surfaces, and ambient temperatures, or leakages can be compensated for, e.g. via diffusion.

One problem with the known systems is that with external pressure medium sources, they must each be maintained, and the pressure in all of the tire cavities must be checked extensively. With the known vehicle-side pressure medium sources, which supply the pressure medium to the tire cavities via rotary feedthroughs, the operational reliability of the rotary feedthroughs for the pressure medium poses a problem. The rotary feedthroughs can only be made robust and durable with a great deal of effort, such that they last as long as a vehicle, which turns out to be expensive and uneconomical.

SUMMARY OF THE INVENTION

The object of the present invention is to create a compressor assembly that reliably and with little maintenance ensures an inflation of the tire cavity with a pressure medium over the entire service life of the vehicle.

The compressor assembly preferably functions automatically. "Automatically" means that it is not necessary to stop and use an external pressure medium source. The operation of the compressor assembly according to the invention can be initiated autonomously, however, i.e. via an arbitrary regulator or control assembly in the vehicle, or in response to a control signal by a vehicle driver.

This object is achieved by a compressor assembly according to the invention characterized in that the compressor assembly comprises at least one compression chamber on the hub, the volume of which can be altered by a translatory movement of a compressor component, wherein a pressure medium that is to be conducted into the tire cavity can be compressed by reducing the volume of the compression chamber, and wherein the compressor assembly comprises a transmission, preferably a cam mechanism, which is configured to convert a rotational movement between the wheel mount and the wheel hub into an oscillating translatory movement of the compressor component through an interaction of a wheel mount-side transmission component with a hub-side transmission component, wherein the transmission component on the wheel mount comprises a cylindrical cam, in particular a beaded cylindrical cam, or the hub-side transmission component comprises a beaded cylindrical cam.

Such a compressor assembly has the advantage that it can be very robust, due to its purely mechanical construction. Because the compression chamber is located on the hub, the pressurized pressure medium is provided directly to a rotating part of the vehicle wheel, such that a rotary feedthrough for the pressure medium is not necessary. In other words, the pressure medium is supplied directly to the location where it is needed, i.e. the rotating tire cavity.

Rotary feedthroughs for a pressure medium are difficult to design and it is difficult to make them reliable and functional in a durable manner. It is also difficult to create such pressure medium rotary feedthroughs due to the adverse conditions in the vicinity of the vehicle wheel, because this area is prone to contaminants and impact-related loads. The compressor assembly according to the invention allows for a pressure medium to always be available with sufficient pressure when driving the vehicle in which the compressor assembly is installed, thus ensuring that the tire can always be sufficiently inflated.

It is advantageous when the translatory movement of the compressor component takes place at least partially in the direction of the axis of rotation, preferably entirely in the direction of the axis of rotation. As a result, the compressor assembly can be made such that it is particularly space-saving in the radial direction, thus orthogonal to the direction of the axis of rotation, while still exhibiting a large volume in the compression chamber.

In the context of the present invention, the hub side and hub-side components are components that are located on the hub for conjoint rotation therewith. These components are thus connected directly or indirectly to the hub, such that they rotate with the hub when the hub rotates in relation to the wheel mount. The wheel mount does not move in relation to the vehicle. The wheel mount side and wheel mount-side components do not rotate in relation to the wheel mount. When the wheel or the wheel hub rotates, there is a relative rotational movement between the wheel mount-side components, e.g. passenger compartment of the vehicle, and the wheels or tires, the wheel hub, and the other hub-side components.

The hub-side transmission component thus always rotates conjointly with the hub-side components that rotate when the vehicle is moving. The wheel mount-side transmission component is non-rotatably connected to the vehicle or wheel mount-side components when the compressor assembly is in operation, and preferably at all times.

The wheel mount-side transmission component is preferably entirely rigid and stationary, such that it cannot move in either a rotary or translatory manner in relation to the wheel mount.

The wheel mount-side transmission component is thus entirely non-rotatably connected to the wheel mount-side components when installed in the vehicle. When the vehicle is driven, none of the parts of the wheel mount-side transmission component rotate. Only the hub-side components rotate, in particular the hub-side transmission component rotates entirely about the axis of rotation.

There is preferably one compressor assembly on each wheel of the vehicle, such that all of the wheels of the vehicle are always supplied with sufficient pressure in their respective tire cavities. Because each wheel thus comprises its own pressure medium supply, rotary feedthroughs for supplying a pressure medium are superfluous.

The subject matter of the present invention also relates to a vehicle in which the compressor assembly described herein is installed.

A freewheeling operating state refers in the following to a state of the hub-side and wheel mount-side transmission elements in which these elements do not interact, such that the compressor assembly is not in operation. A functional operating state refers to a state of the hub-side and wheel mount-side transmission components in which these elements do interact, and the compressor assembly is thus functioning.

It is of particular advantage when the hub-side transmission component comprises a tappet output drive. As a result, the compressor assembly can be designed in a space saving manner, while still remaining reliable.

The oscillating translatory movement of the hub-side compressor component preferably runs along the axis of rotation. As a result, the compressor assembly can be compact, and imbalances can be prevented.

It is also particularly preferred that the hub-side transmission component comprises a contact mechanism, wherein the contact mechanism has a contact element in front of and behind the beaded cylindrical cam of the wheel mount-side transmission component, seen in the direction of the axis of rotation, for establishing a contact with the beaded cylindrical cam of the wheel mount-side transmission component. As a result, the hub-side transmission component can be in contact, or brought into interaction, with the wheel mount-side transmission component.

The contact elements for establishing a contact with the beaded cylindrical cam of the wheel mount-side transmission component do not need to be in constant contact with the beaded cylindrical cam, but instead, they can be lifted away therefrom in a preferred embodiment. This forms an embodiment of a coupling mechanism.

It is preferred when the contact elements are pretensioned in a position in which they are in contact with the beaded cylindrical cam, and there are additional coupling elements that raise the contact elements of the hub-side transmission component away from the beaded cylindrical cam counter to their pretensioning, when interaction between the wheel mount-side transmission component and the hub-side transmission component is not desired, wherein the coupling element are preferably pretensioned in the position in which they raise the contact elements away from the beaded cylindrical cam.

It is also advantageous when the hub-side transmission component comprises a contact mechanism with a contact element for establishing a contact with the beaded cylindrical cam along a variable contact section. Advantageously, the contact element is supported such that it can slide in the direction of the axis of rotation, preferably pretensioned in a position in which it is not in contact with the beaded cylindrical cam. A variable contact section means that the precise position where the contact element is in contact with the beaded cylindrical cam, thus the position of the contact section, is not clearly defined, but instead varies when the compressor assembly is in operation, in particular randomly. This reduces wear to the beaded cylindrical cam. In order to obtain such a variable contact section, the position of the contact element can be established through an interaction between a spring pretensioning and the force exerted by the pressure medium, for example. Because the force exerted by the pressure medium is never absolutely constant, the contact elements basically flutter back and forth.

It is also advantageous when the compressor component comprises an annular piston. This results in a large displacement volume, or a high delivery rate of the compressor assembly, with low space requirements.

In an advantageous embodiment of the compressor assembly according to the invention, the compressor assembly is designed such that there is a compression chamber located in front of and behind a contact section of the hub-side transmission component, seen along the axis of rotation, that comes in contact with the cylindrical cam of the wheel mount-side transmission component. As a result, the displacement volume, or the delivery rate, of the compressor assembly according to the invention can be particularly high.

An embodiment variation in which there are two compression chambers is also advantageous, wherein the volume of the one compression chamber is reduced when the volume of the other compression chamber is increased, and vice versa. By this means, the delivery rate of the compressor assembly remains constant.

It is also advantageous when the wheel mount-side transmission component is located radially inward from the hub-side transmission component. In this manner, the compressor assembly can be particularly space-saving.

It is also advantageous when the wheel mount-side transmission component is located radially outward from the hub-side transmission component. In this manner, a mechanically stable compressor assembly, in particular, can be obtained.

It is also advantageous when the wheel mount-side transmission component comprises a beaded cylindrical cam with a circular disk section. This results in a smooth coupling of the transmission components to one another.

It is also advantageous when the hub-side transmission component comprises a roller tappet, preferably a self-lubricating roller tappet, provided in particular with a lubricant reservoir. This ensures a low-friction contact between the hub-side transmission component and the wheel mount-side transmission component.

It is also advantageous when there is a shutter valve on the compressor component. This forms an operationally reliable and inexpensive design of an intake-side non-return valve for the compressor component.

It is also advantageous when there is a double ring seal on the compressor component, which borders on a lubricant reservoir of the compressor component, and also seals the compression chamber against the compressor component. By this means, the compressor assembly can be obtained in a space-saving manner, and inexpensively.

It is also advantageous when the shutter valve is an integral part of at least a part of the double ring seal. By this means, the assembly can be produced such that it is particularly simple to maintain, and inexpensively.

It is also advantageous when the compressor assembly comprises a coupling mechanism, by means of which the hub-side transmission component can be brought into interaction with the wheel mount-side transmission component. In this embodiment, the interaction between the hub-side transmission component and the wheel mount-side transmission component can be interrupted or activated as necessary.

It is also advantageous when the coupling mechanism is designed such that the hub-side transmission component is pretensioned in a position in which it does not interact with the wheel mount-side transmission component. The compressor assembly can thus be switched on when necessary, and returns automatically to its freewheeling operating state.

It is also advantageous when the coupling mechanism can be actuated pneumatically, magnetically, or electromagnetically. It is particularly advantageous when the actuation is pneumatic, because this is particularly reliable.

A rechargeable battery and/or generator are advantageously located in the region of the vehicle wheel. The rechargeable battery can be charged via sliding contacts by the main battery of the vehicle, or via a generator, which converts a rotational relative movement between the wheel mount-side and hub-side components into electrical energy.

It is also advantageous when the coupling mechanism can be actuated by means of the pressure medium in the tire cavity. The pressurized pressure medium from the tire cavity basically forms a continuously available energy store, which can be used for the coupling.

It is also advantageous when a coupling valve forms a fluid connection between the coupling mechanism and the tire cavity, on which the pressure medium from tire cavity bears, and which opens when the tire pressure falls below a tire pressure threshold value, by means of which the coupling mechanism is actuated by means of the pressure medium from the tire cavity, and the hub-side transmission component interacts with the wheel mount-side transmission component. The operation of the compressor assembly is initiated automatically, as soon as it is necessary to increase the tire pressure. As a result, the tire cavity always has a sufficient supply of the pressure medium.

It is also advantageous if the coupling valve closes when the tire pressure falls exceeds a tire pressure target value, which is preferably higher than the tire pressure threshold value, by means of which the coupling mechanism is no longer subjected to the pressure medium, preferably wherein air is bled from the coupling mechanism by the coupling valve or a relief valve when the tire pressure exceeds the tire pressure target value. As a result, the compressor assembly immediately shuts down as soon as a pressure medium target value is reached in the tire cavity.

It is also advantageous when the compressor assembly comprises a mechanism for measuring and/or indicating the pressure, temperature, and/or moisture of the pressure medium in the tire cavity, which can preferably be connected to the tire cavity via the pressure medium line. As a result, the parameters of the pressure medium in the tire can be continuously recorded, because the compressor assembly can always be in contact with the pressure medium in the tire cavity.

It is advantageous when the compressor assembly is connected to a filter at the pressure medium intake side. This prevents clogging in the compressor assembly.

It is advantageous when the compressor assembly is designed to use the pressure medium from the tire cavity, or by conveying the pressure medium through the compressor assembly, to clean the filter. As a result, the compressor assembly is self-maintaining.

BRIEF DESCRIPTION OF SEVERAL VIEWS OF THE DRAWINGS

Further features, application possibilities and advantages of the invention can be derived from the following description of exemplary embodiments of the invention, which shall be explained in reference to the drawings, wherein the features may be substantial to the invention in and of themselves as well as in different combinations, without this necessarily being indicated explicitly.

DETAILED DESCRIPTION OF THE INVENTION

Corresponding components and elements have the same reference symbols in the figures. For purposes of clarity, not all of the figures have all of the reference symbols.

Figure 1:
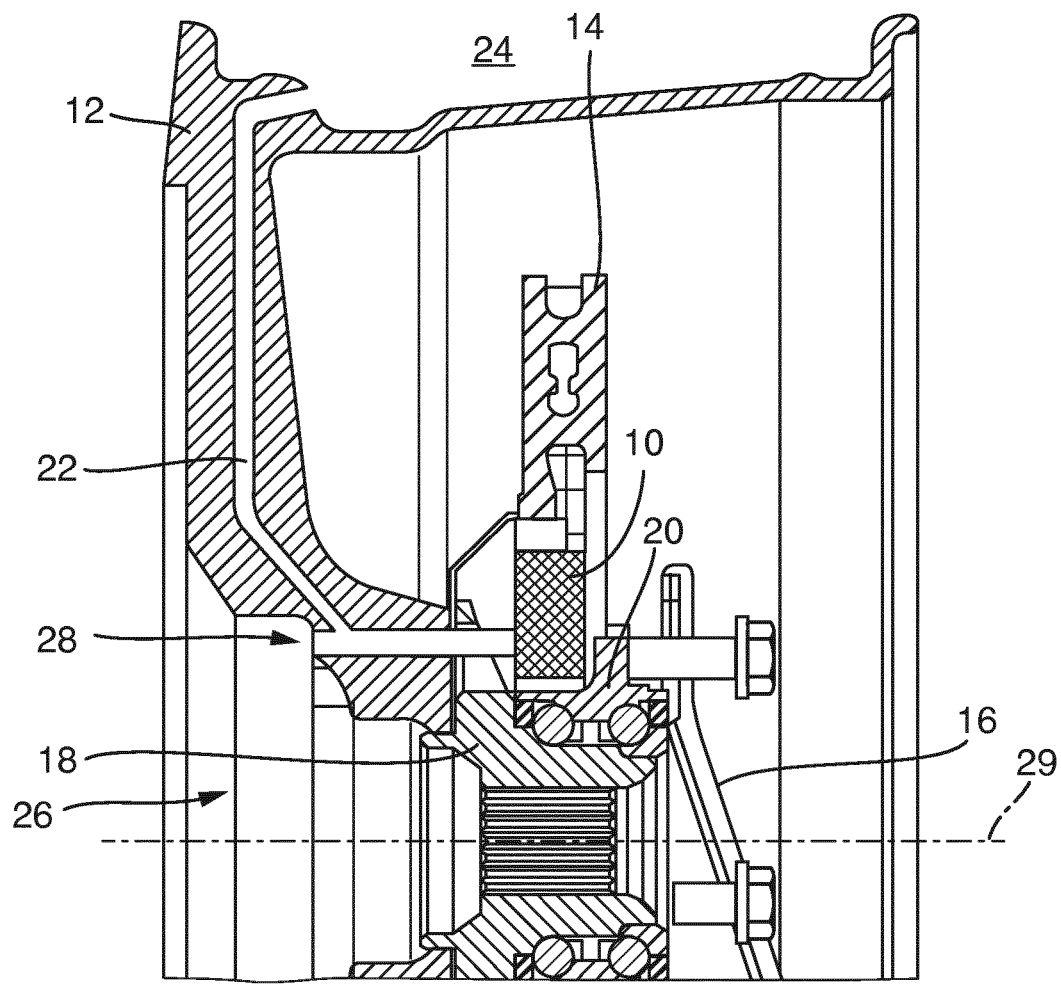
FIG. 1 shows, schematically, an installation position of a compressor assembly according to the invention.

The installation position of a compressor assembly 10 according to the invention is shown schematically in FIG. 1. The compressor assembly 10 is only indicated schematically in FIG. 1 by the cross-hatched region.

A wheel rim is indicated by the reference symbol 12. A brake disk has the reference symbol 14, a wheel mount has the reference symbol 16, a wheel hub has the reference symbol 18, and a wheel bearing has the reference symbol 20.

A pressure medium line 22 extends from the compressor assembly 10 to the tire cavity 24. The tire itself is not shown in FIG. 1.

The rim has a schematically illustrated connection 28 in the vicinity of a tire hub mount 26 through which a sealing medium is supplied. The connection 28 is optional.

In the embodiment shown in the FIG. 1, the pressure medium line 22 extends through the material of the rim 12. Advantageously, a section of the pressure medium line 22 is obtained through a hollow brake disk securing screw in the brake disk 14. An axis of rotation has the reference symbol 29. The hub rotates in relation to the wheel mount about the axis of rotation 29 when the vehicle is operated.

Figure 2:
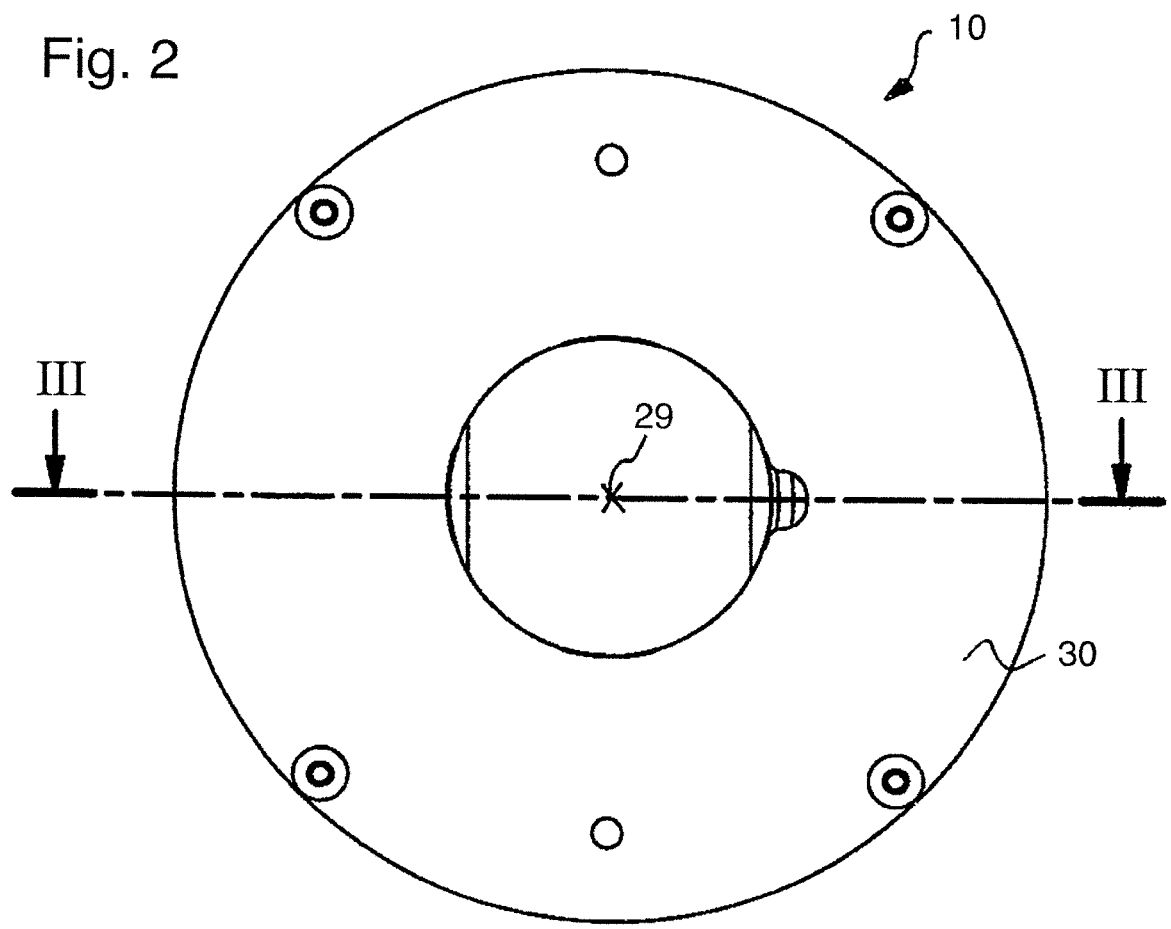
FIG. 2 shows a compressor assembly with a wheel mount-side beaded cylindrical cam, according to one embodiment of this invention.

FIGS. 2 to 5 show a first embodiment from various perspectives, wherein the compressor assembly 10 is shown from above in FIG. 2. The compressor assembly 10 is shown cut along the line III-III in FIG. 3.

The compressor assembly comprises a first hub-side housing component 30 and a second hub-side housing component 32.

Hub-side transmission components have the reference symbol 34. Two of the hub-side transmission components 34 of the compressor assembly 10 can be seen in FIG. 3.

An annular piston 36 is connected to the hub-side transmission components 34, which forms a compressor component 38. The compressor component 38 in the form of the annular piston 36 delimits a first compression chamber 40 and a second compression chamber 42.

Figure 3:
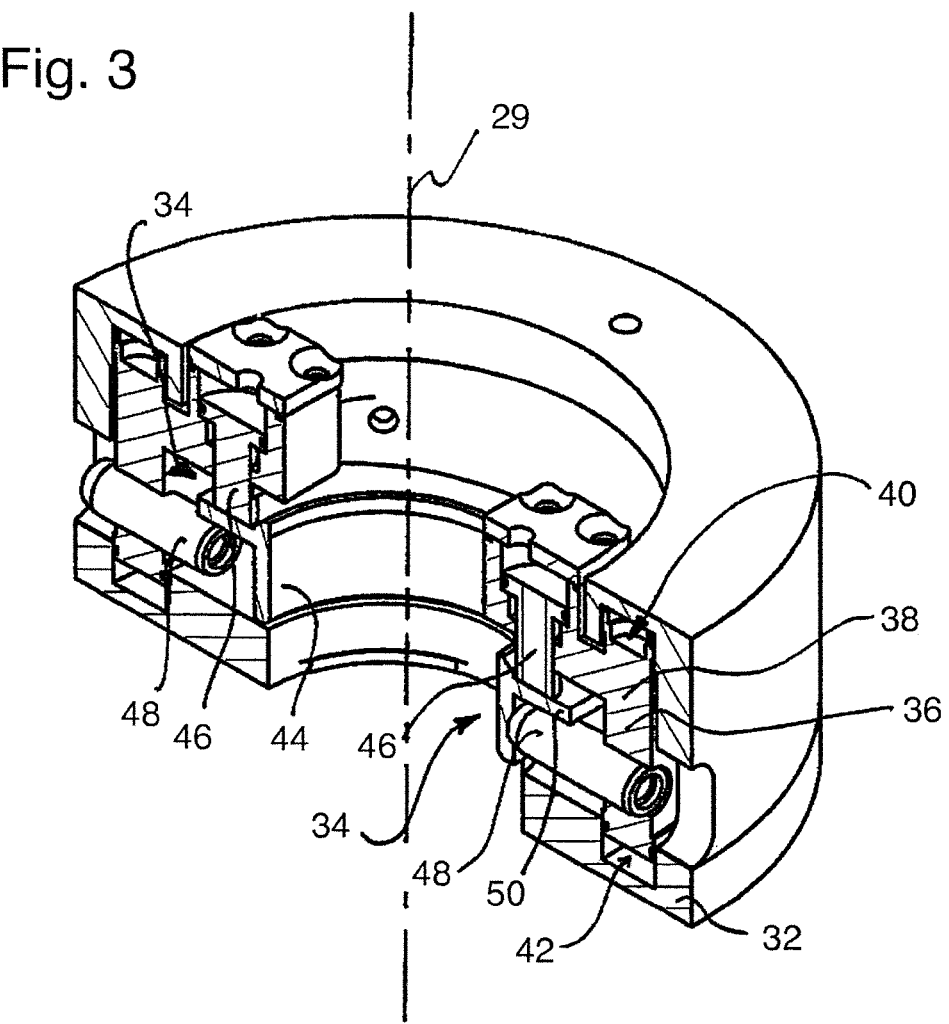
FIG. 3 is a sectional perspective view of the compressor assembly of FIG. 2.
Figure 4:
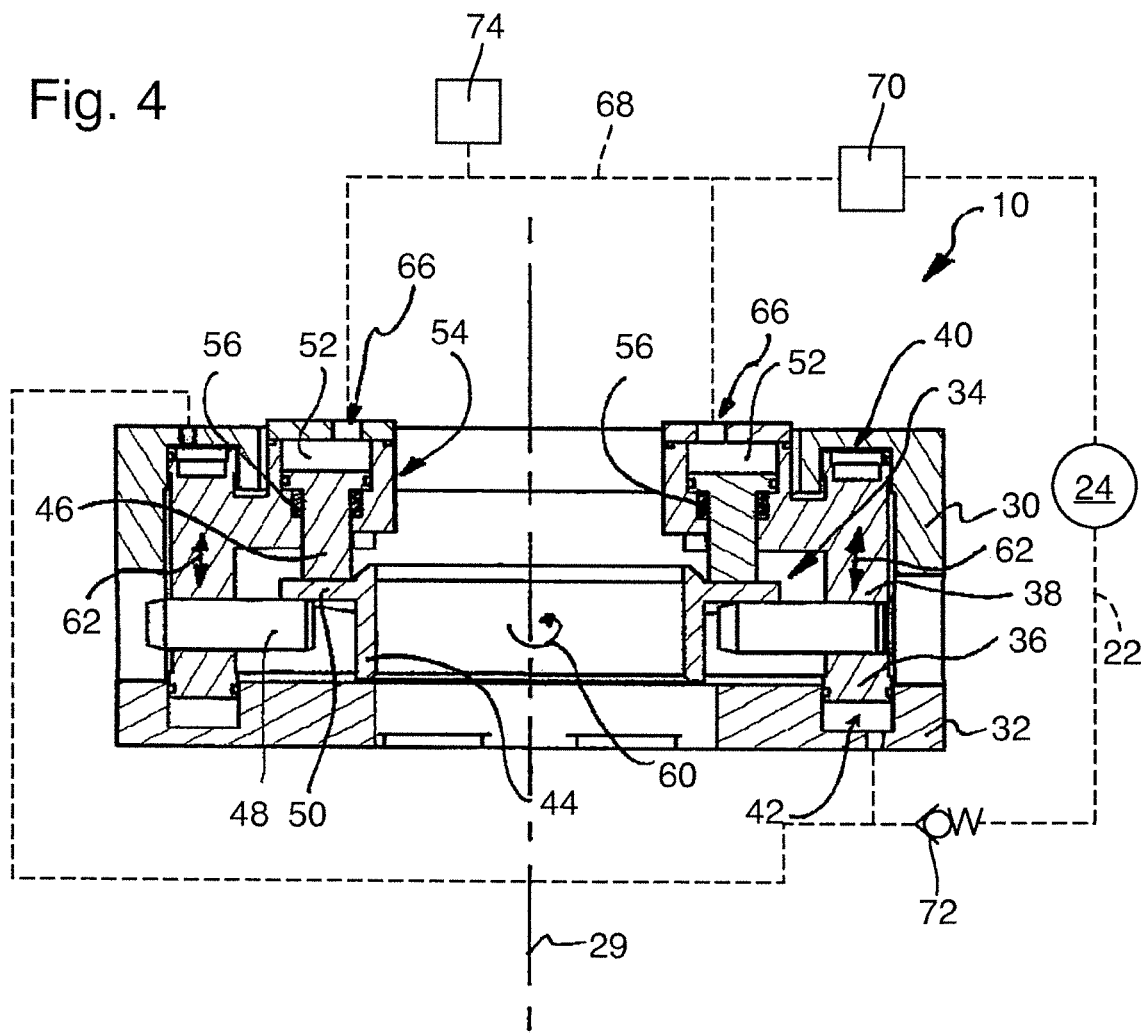
FIG. 4 is a sectional view of the compressor assembly of FIG. 2.

The hub-side transmission elements 34 are engaged with a wheel mount-side transmission component 44 in the functional operating state shown in FIGS. 3 and 4, such that they can interact therewith. The hub-side transmission elements 34 collectively form a cam mechanism 45 with the wheel mount-side transmission element 44, wherein the hub-side transmission elements 34 form a tappet output drive.

The hub-side transmission components 34 each have a first actuatable contact element 46 and second stationary contact element 48.

The contact elements 46, 48 of the respective hub-side transmission components 34 are in contact with a beaded cylindrical cam 50 of the wheel mount-side transmission component 44, by means of which the hub-side transmission component 34 interacts with the wheel mount-side transmission component 44.

As stated above, the first contact elements 46 can be actuated. This can be seen clearly in FIG. 4. The first contact elements form a coupling mechanism 54 with a dedicated pressure chamber 52.

By actuating the coupling mechanism 54, the hub-side transmission components 34 can interact with the wheel mount-side transmission element 44. When the actuation of the coupling mechanism 54 is interrupted, interaction between the hub-side transmission components 34 and the wheel mount-side transmission component 44 can be prevented.

The coupling mechanism 54 is shown in the actuated, or coupled, state in FIGS. 3 and 4. The compressor assembly 10 is then in the functional operating state.

Figure 5:
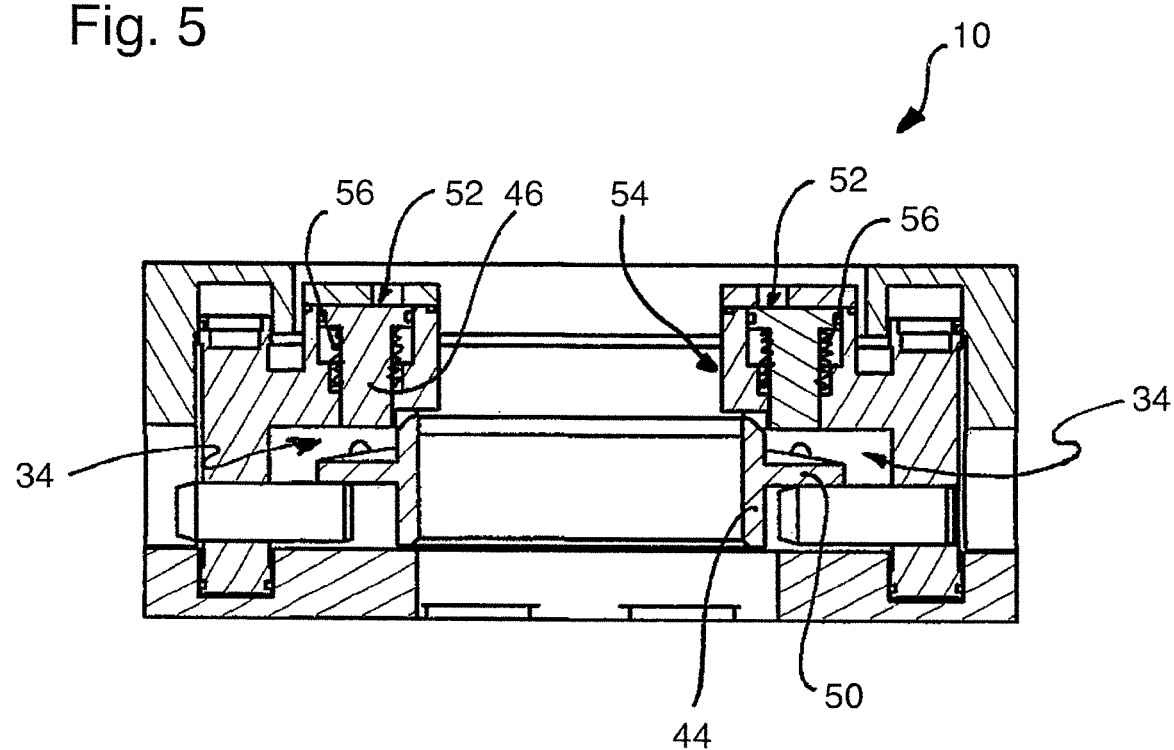
FIG. 5 is a sectional view of the compressor assembly of FIG. 2.

The coupling mechanism 54 is shown in an unactuated, or decoupled, state in FIG. 5. The compressor assembly 10 is then in the freewheeling operating state.

In this freewheeling operating state, the first actuatable contact elements 46 are not in contact with the beaded cylindrical cam 50 of the wheel mount-side transmission component 44. The hub-side transmission components 34 are thus prevented from interacting with the wheel mount-side transmission element 44.

In order to switch the compressor assembly 10 from the freewheeling operating state shown in FIG. 5 to the functional operating state, the pressure chambers 52 are subjected to the pressure medium.

The first actuatable contact elements 46 are in the form of pistons, and move toward the beaded cylindrical cam 50 when subjected to the pressure medium, and come in contact therewith. This state is shown in FIGS. 3 and 4.

The first actuatable contact elements 46 are pretensioned by compression springs 56, such that the compressor assembly 10 is switched to a freewheeling operating state when the pressure chambers 52 are not subjected to the pressure medium. The coupling mechanism 54 is thus pretensioned in an unactuated state.

When a vehicle is driven, a rotational relative movement takes place about the axis of rotation 29 between the wheel mount-side transmission component 44 and the hub-side transmission component 34.

This is indicated by the curved arrow with the reference symbol 60 in FIG. 4.

In the functional operating state of the compression assembly 10, the annular piston 36, or the compressor component 38 it forms is moved back and forth along the axis of rotation 29 by the interaction of the wheel mount-side transmission component 44 with the hub-side transmission components 34, as is indicated by the double arrow with the reference symbol 62. The pressure medium is conveyed out of the annular compression chambers 40 and 42 by the oscillating translatory movement of the annular piston 36 with each back and forth movement.

The control of the compression assembly 10 shall be schematically explained in reference to FIG. 4.

The intakes 66 on the pressure chamber 52 are each connected to the tire cavity 24 via a section 68 of a pressure medium line 22, through a valve 70 forming a coupling valve. The coupling valve 70 is designed such that it opens when the pressure in the tire falls below a pressure threshold value.

The pressure chambers 52 are then subjected to the pressure medium from the tire cavity 24. The first actuatable contact elements 46 are then moved toward the beaded cylindrical cam 50, counter to the pretensioning of the springs 56, and come in contact therewith.

The oscillating translatory movement of the compressor component 38, or its annular piston 36, is generated by the rotational relative movement between the wheel mount-side transmission component 44 and the hub-side transmission component 34, and the interaction of the two transmission components. The oscillating translatory movement of the compressor component 38 reduces the volumes of the compression chambers 40 and 42 in an alternating manner, by means of which the pressure medium is conveyed therefrom to the tire cavity 24.

The pressure chambers 40 and 42 are connected to the tire cavity 24 via a non-return valve 72. The non-return valve 72 is open toward the tire cavity 24.

When the pressure of the pressure medium in the tire cavity 24 reaches a target value, or exceeds it, the coupling valve 70 closes, and the air is bled out of the line section 68 between the coupling valve 70 and the pressure chamber 52 via a relief valve 74. As a result, the actuatable contact elements 46 move away from the beaded cylindrical cam 50 to the position shown in FIG. 5 due to their pretensioning.

FIGS. 6 to 9 show another embodiment of the compressor assembly 10 according to the invention. The wheel mount-side transmission component comprises a beaded cylindrical cam 50 therein.

In differing from the previous embodiment, the hub-side transmission component 34 in this embodiment does not comprise a stationary contact element 48, but instead has two actuatable contact elements 46, which are located in front of and behind the beaded cylindrical cam 50, when viewed in the direction of the axis of rotation 29.

Figure 6:
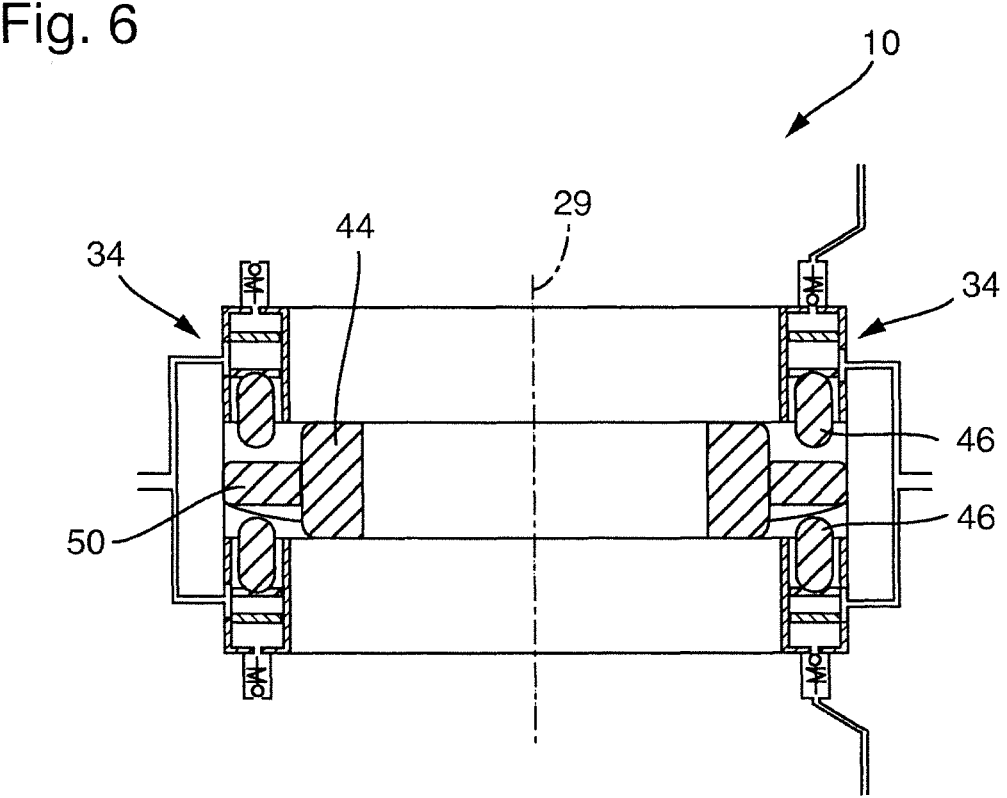
FIGS. 6 and 7 each show a compressor assembly, according to another embodiment of this invention.
Figure 7:
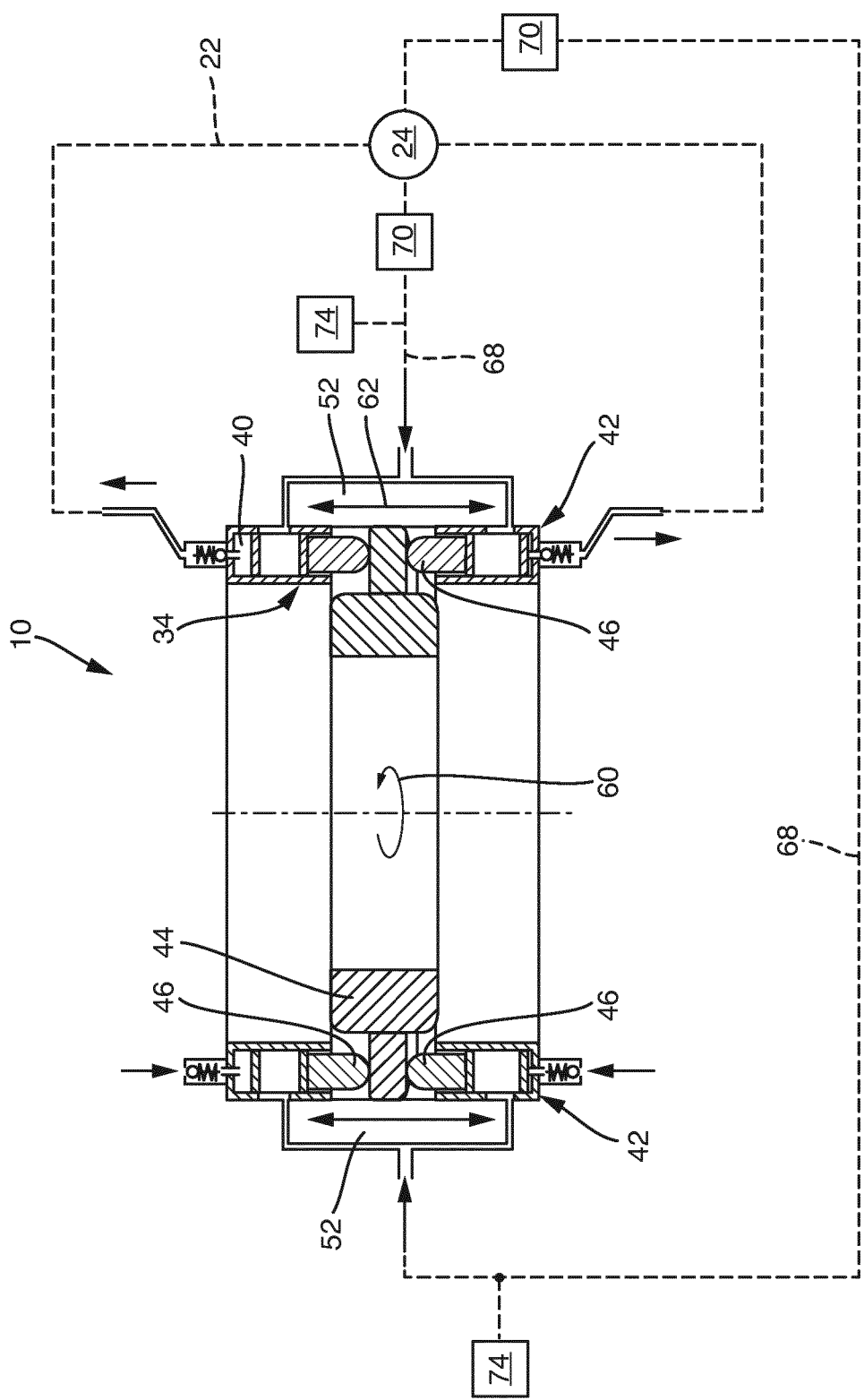

The compressor assembly 10 in this embodiment is shown in FIG. 6 in a freewheeling operating state, and in a functional operating state in FIG. 7.

The compressor assembly 10 in FIGS. 6 and 7 also differs from the previous compressor assembly 10 according to FIGS. 2 to 5 in that each of the pressure chambers 52, via which the actuatable contact elements 56 can be subjected to a pressure medium and actuated, are connected to the tire cavity 24 via a discrete line section 68 with a discrete coupling valve 70 and relief valve 74. The functioning principles of the coupling valve 70 and the relief valve 74 are the same as in the previous embodiment according to FIGS. 2 to 5.

Figure 8:
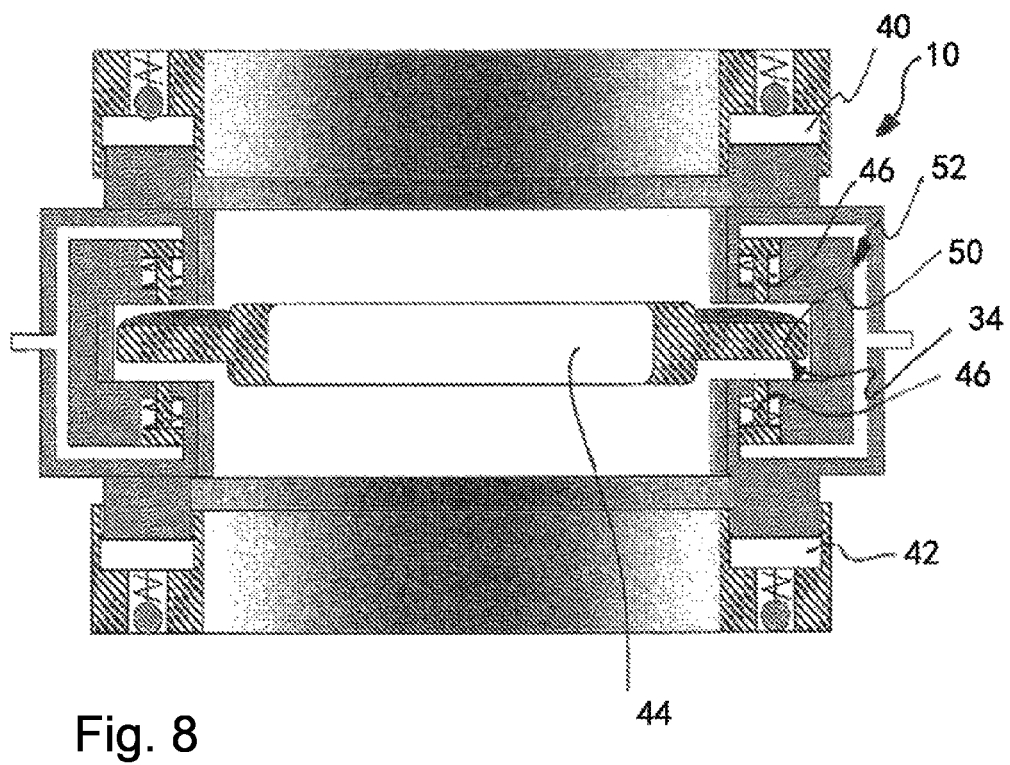
FIGS. 8 and 9 each show a compressor assembly, according to another embodiment of this invention.
Figure 9:
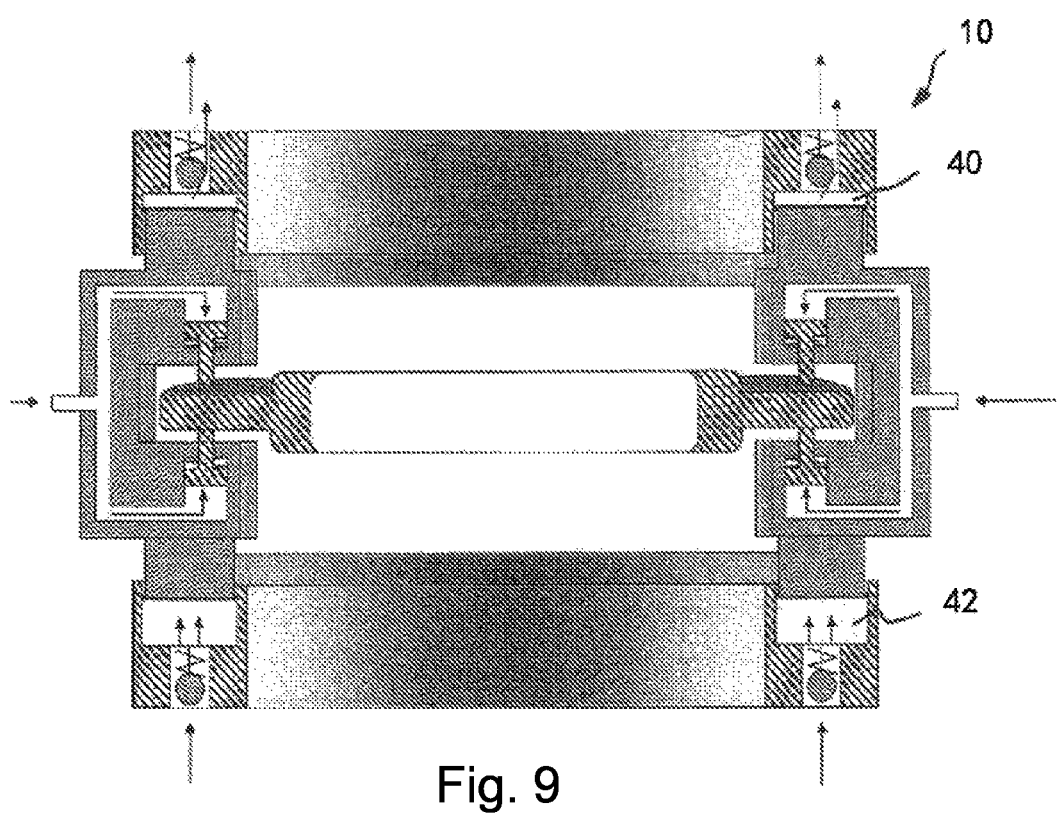
Figure 10:
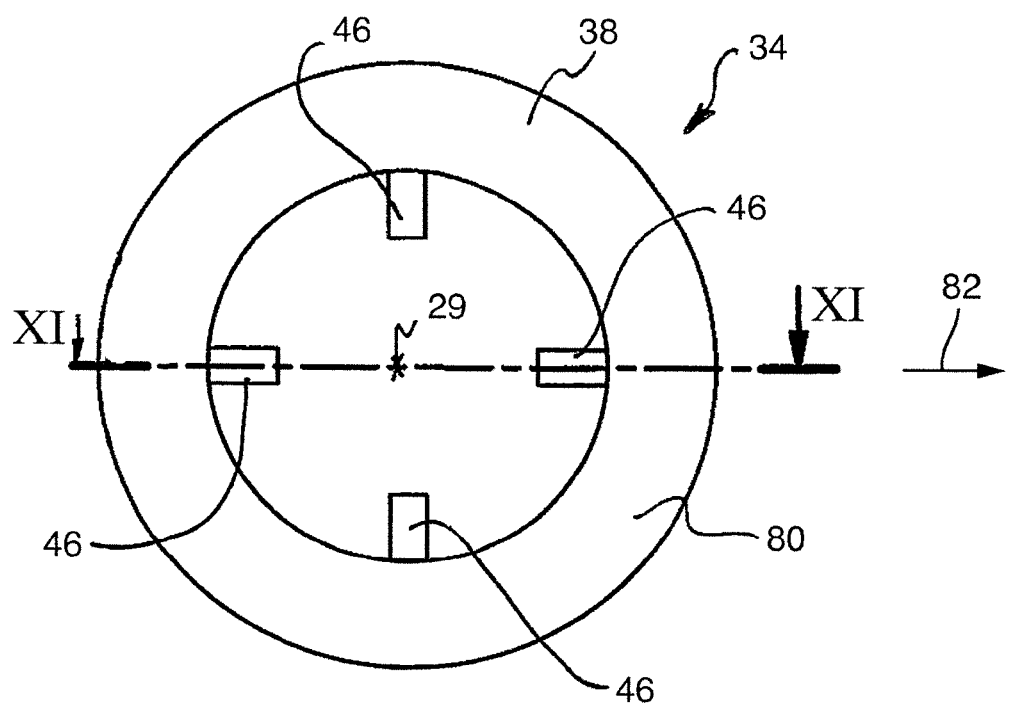
FIG. 10 shows a hub-side transmission component according to one embodiment of this invention.
Figure 11:
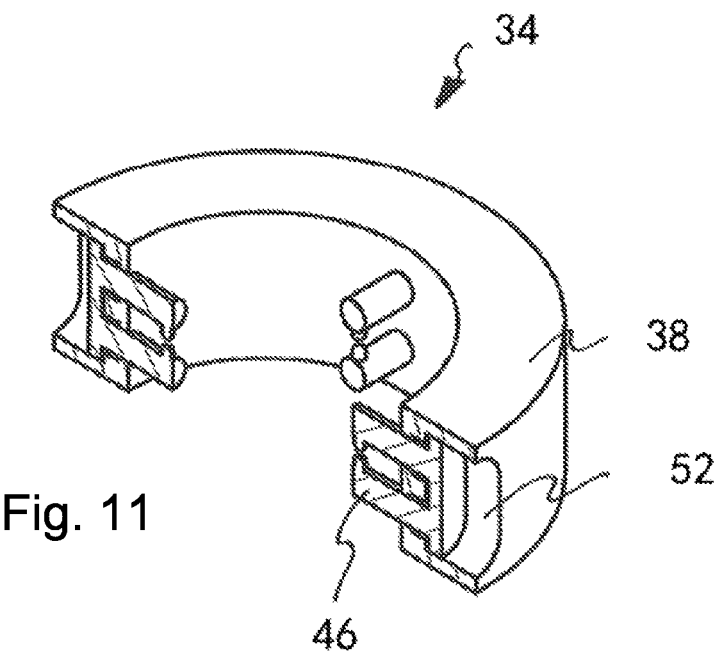
FIG. 11 is a sectional view of the transmission component of FIG. 10.
Figure 12:
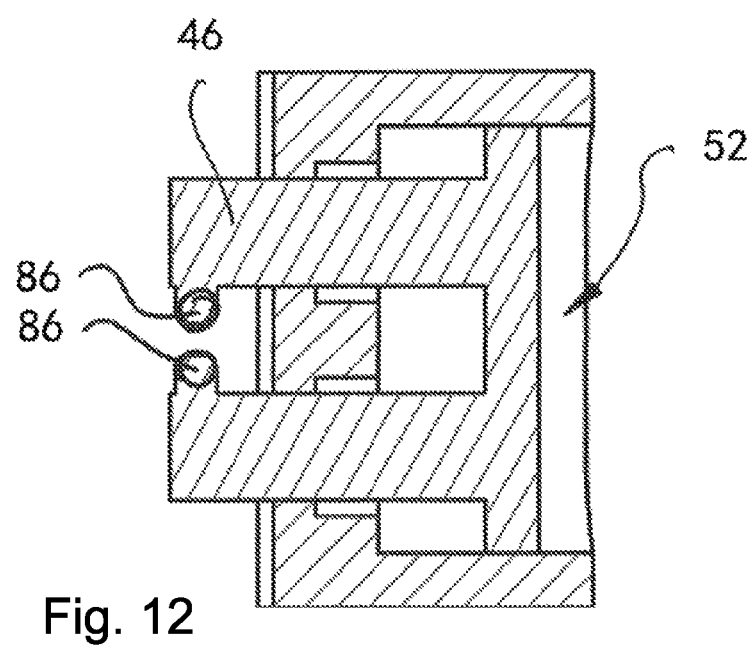
FIGS. 12 and 13 are view of components from the sectional view of FIG. 11.
Figure 13:
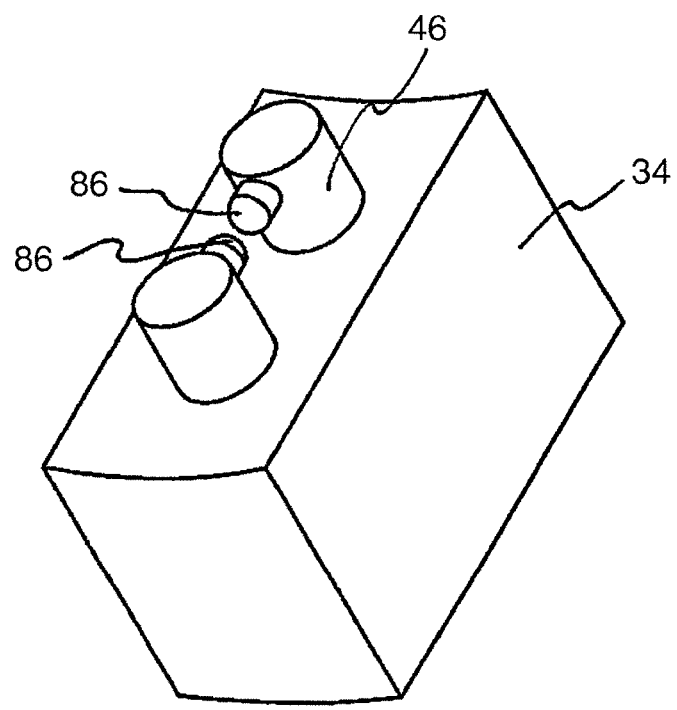

FIGS. 8 and 9 show another embodiment of the compressor assembly 10 according to the invention. The pressure medium lines 68 and 22 are not shown in FIGS. 8 and 9, nor are the coupling valves 70, 74 and the tire cavity 24.

An alternative design of the hub-side transmission component 34 is shown in detail in FIGS. 10 to 13. The hub-side transmission component 34 according to FIGS. 10 to 13 comprises four actuatable contact elements 46 located on an annular retaining section 80, which can also function as a compressor component 38.

The actuatable contact elements 46 of this embodiment cannot move in the direction of the axis of rotation 29, but move radially 82 instead. The contact elements 46 thus move radially toward the beaded cylindrical cam 50 when the coupling mechanism 54 is actuated. For this, the contact elements 46 each have two rotating spherical sections 86. The rotating spherical sections 86 can have a self-lubricating design, with a lubricant reservoir in the contact elements 46.

Figure 14:
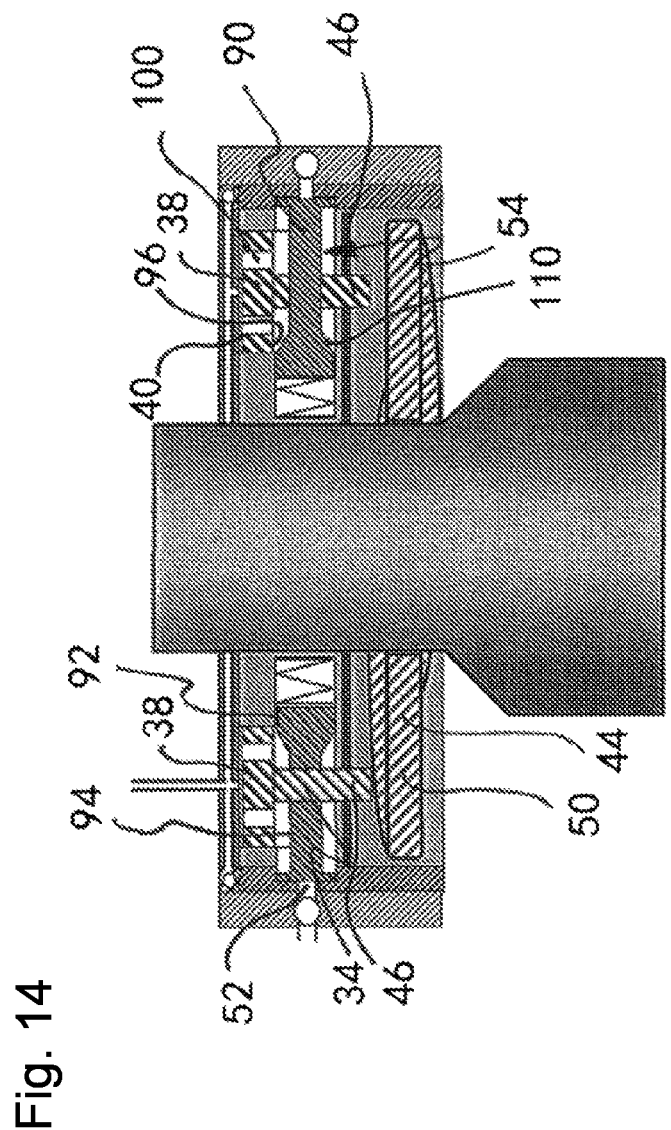
FIGS. 14 and 15 each show a compressor assembly, according to another embodiment of this invention.
Figure 15:
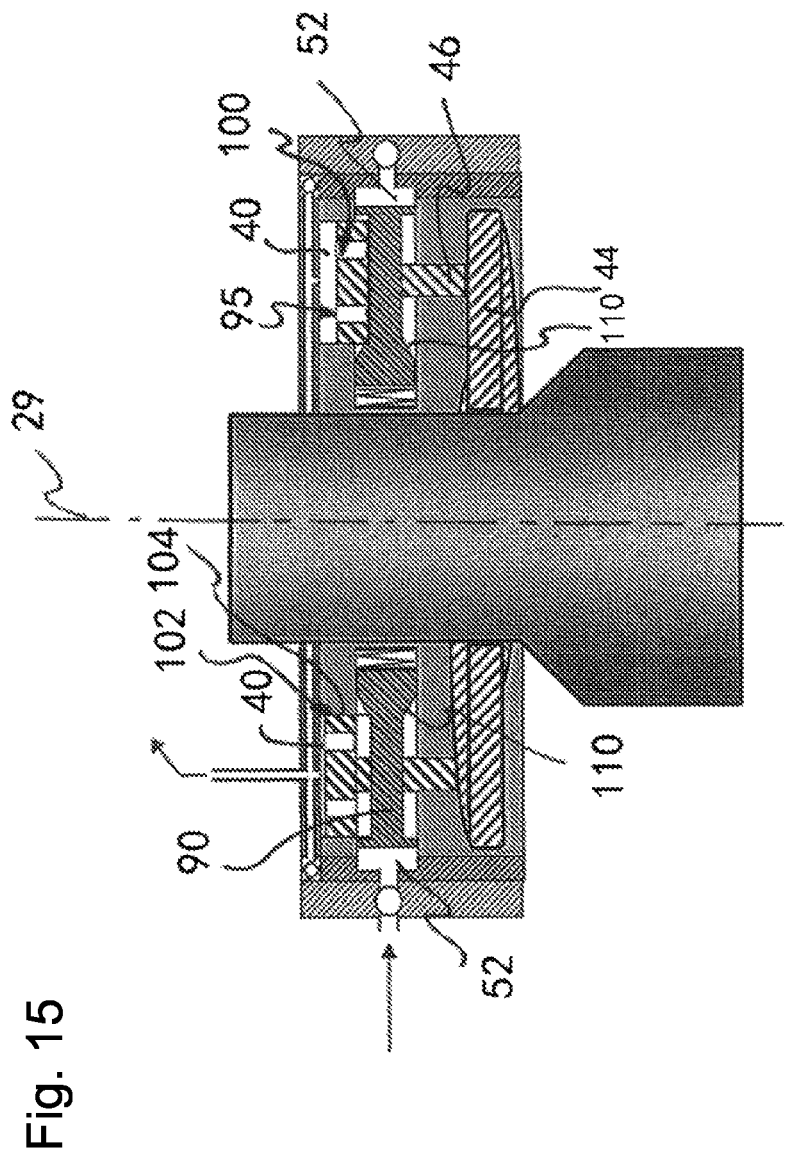

Another alternative embodiment of the compressor assembly 10 according to the invention is shown in FIGS. 14 and 15. In the embodiment of the compressor assembly 10 according to FIGS. 14 and 15, the coupling mechanism 54 is formed by a spring-loaded coupling element 90. The coupling element 90 has a locking section 92 and a releasing section 94.

In the freewheeling operating state shown in FIG. 14, the coupling elements 90 are not subjected to the pressure medium via the pressure chamber 52, and the locking section 92 is in contact with a stop section 96 of the contact element 46. The stop section 96 of the contact element 46 is formed by a side of the compressor component 38 facing away from the compression chamber 40. The contact elements 46 form the hub-side transmission component 34 in this embodiment.

When the pressure chambers 52 are pressurized, as shown in FIG. 15, the coupling elements 90 move radially inward, and the locking section 92 is no longer in contact with the stop section 96, but instead, the releasing section 94 is beneath the compressor component 38, seen in the direction of the axis of rotation 29. The contact elements 46 can then move along the axis of rotation 29.

The contact elements 46 are pretensioned in a position in which they are in contact with the beaded cylindrical cam 50 of the wheel mount-side transmission component 44. The pretensioning is obtained via a spring, not shown in FIGS. 14 and 15. Channels 100 are formed on the compressor assembly in the embodiment according to FIGS. 14 and 15, which lead to the compression chamber 40 with shutter valves 95, not shown in detail. The shutter valves open when the compressor component 38 moves toward the beaded cylindrical cam 50, and close when the compressor component 38 moves away from the beaded cylindrical cam 50, along the axis of rotation 39.

Advantageously, the shutter valves 95 are connected to a double ring seal 102. The double ring seal 102 extends around the compressor component 38, and advantageously borders a lubricant reservoir 104 on both sides, via which the compressor component 38 is supplied with lubricant.

Transition sections 110 are formed on the coupling elements 90, which form a transition between the locking section 92 and the releasing section 94. The transition sections 110 are designed such that, when the coupling elements 90 are not subjected to the pressure medium, they return to their position shown in FIG. 14 as a result of their pretensioning, such that they force the compressor components 38 away from the beaded cylindrical cam 50, when seen in the direction of the axis of rotation 29, such that the contact elements 46 are no longer in contact with the beaded cylindrical cam 50, independently of the position of the wheel mount-side transmission element 44 in relation to the beaded cylindrical cam 50. In other words, the coupling elements 90 are designed and pretensioned such that, when the coupling mechanism 54 is not actuated, the hub-side transmission components are forced into a position in which they not only no longer interact with the wheel mount-side transmission component 44, but are also entirely lifted away therefrom, i.e. no longer come in contact therewith.

Figure 16:
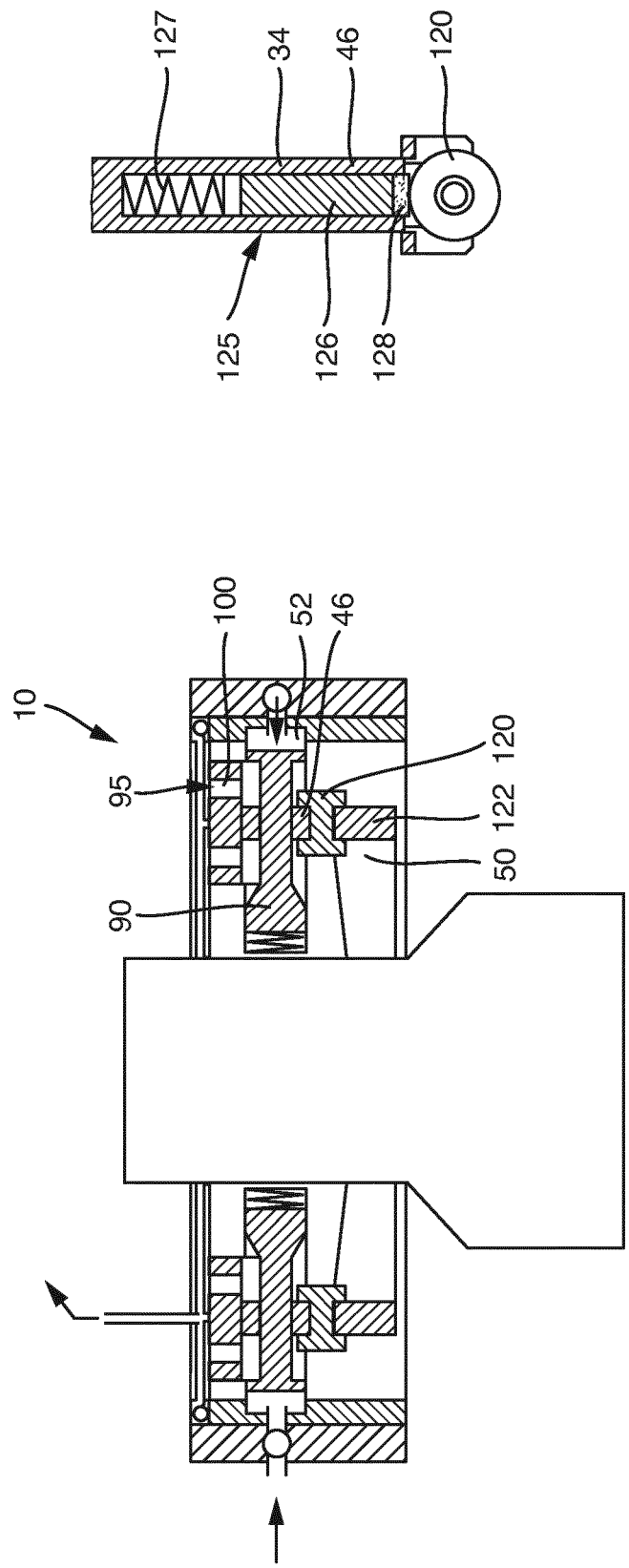
FIGS. 16 and 17 each show a compressor assembly, according to another embodiment of this invention.
Figure 17:
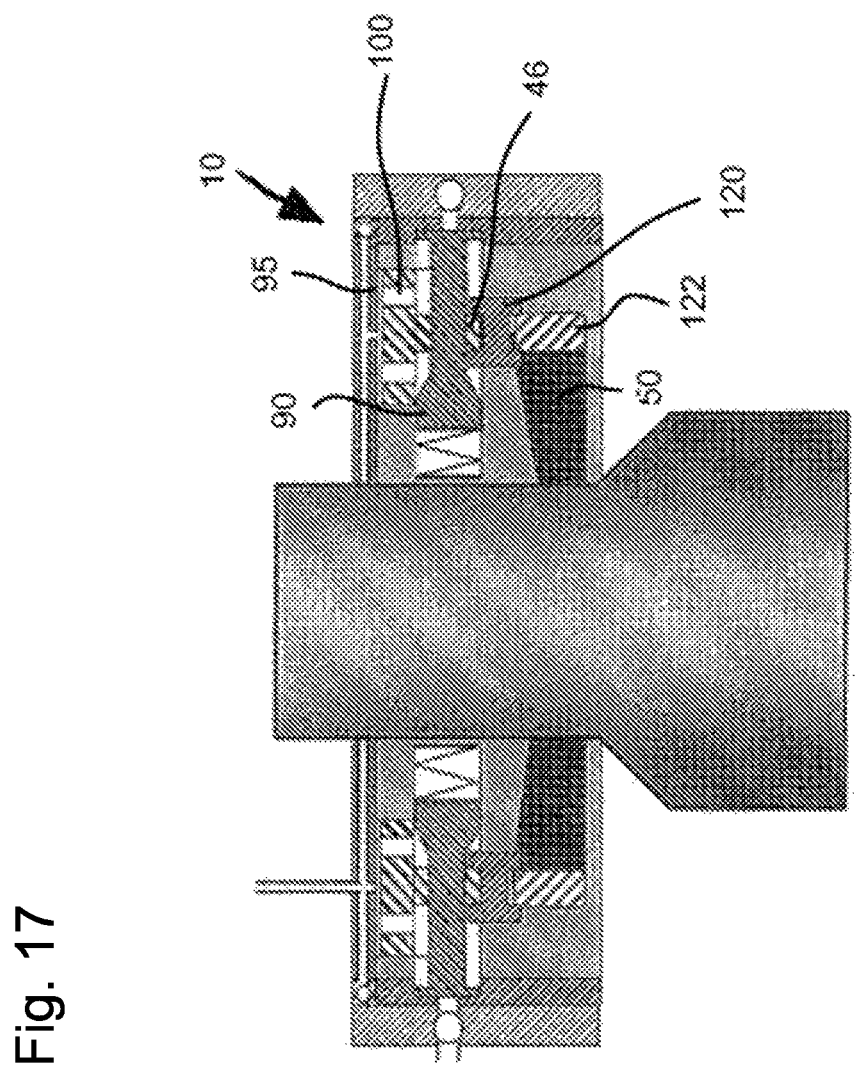

Another embodiment of the compressor assembly 10 according to the invention is shown in the functional operating state in FIG. 16, and in the freewheeling operating state in FIG. 17. The embodiment shown herein differs from the embodiment according to FIGS. 14 and 15 in that self-lubricating rollers 120 are formed on the actuatable contact elements 46.

The beaded cylindrical cam 50 has a guide section 122 for the rollers 120. A lubricant reservoir 125 is dedicated to the rollers, which is located in the actuatable contact element 46, thus in the hub-side transmission component 34. The lubricant 126 in the lubricant reservoir is pretensioned toward the rollers 46, in the present case by a spring 127.

A leakage protection 128 is located between the rollers 120 and the lubricant reservoir, which is designed to ensure that the lubricant 126 is only discharged from the lubricant reservoir to the extent that it is needed for lubrication, independently of the operating states, e.g. when heated.

This design for a self-lubricating roller 120 can be combined with all of the embodiments of this invention described herein.

Figure 18:
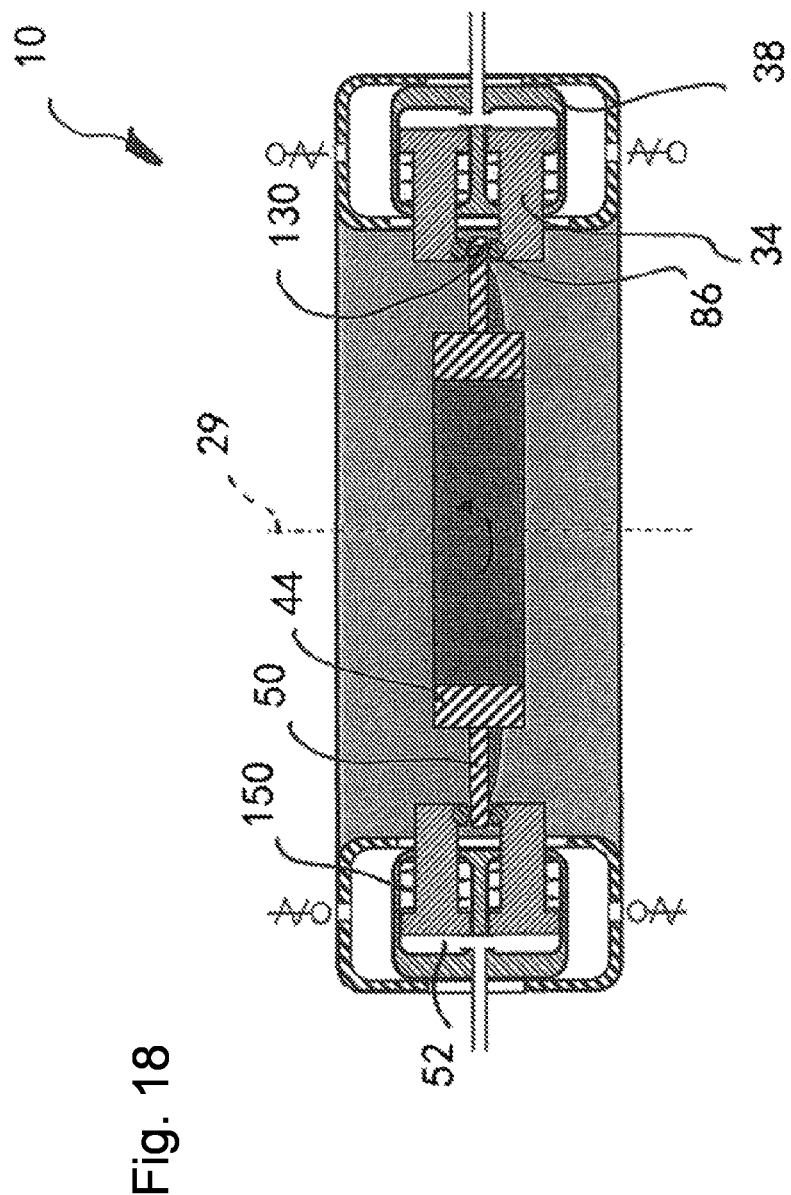
FIGS. 18 to 20 each show a compressor assembly, according to another embodiment of this invention.
Figure 19:
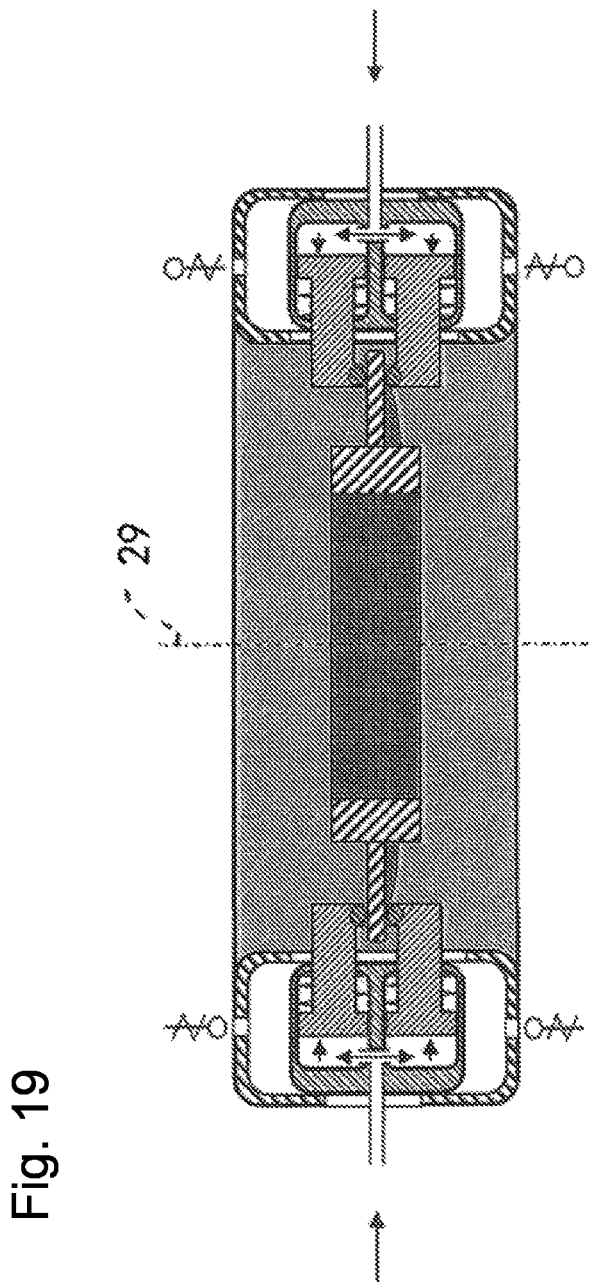
Figure 20:
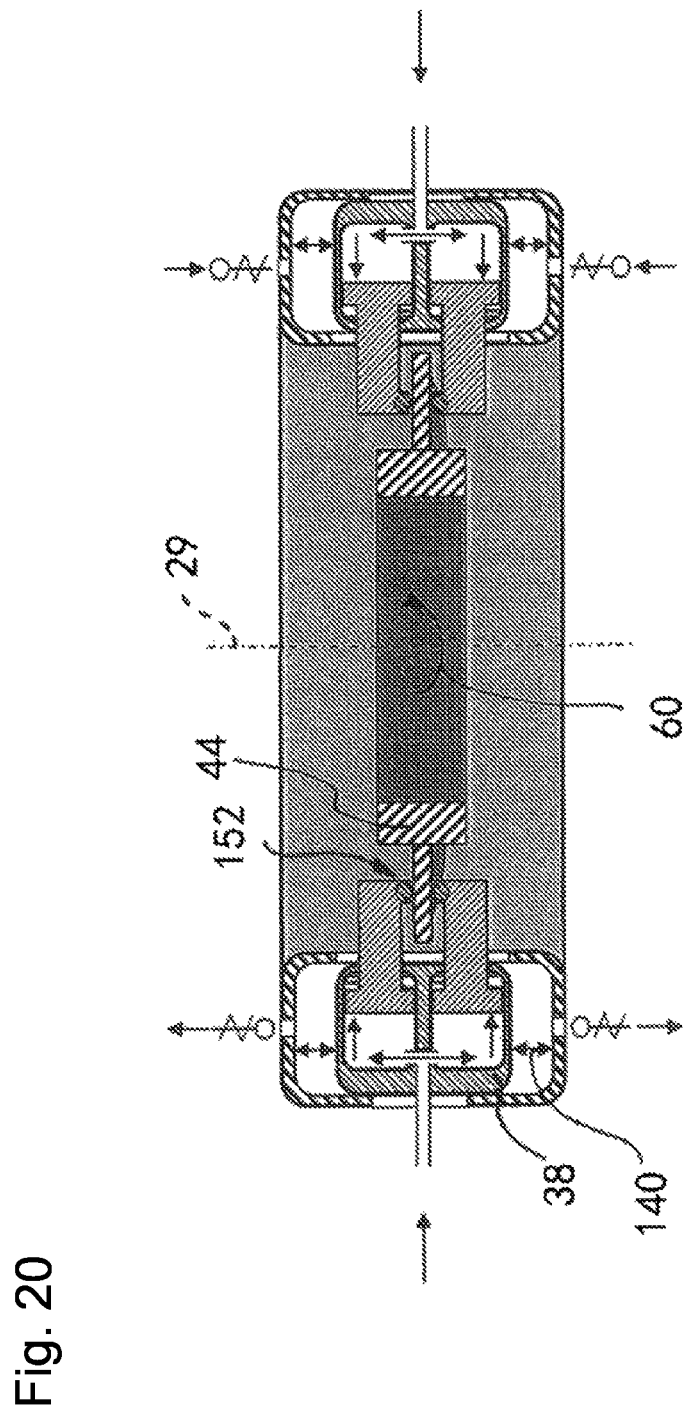

Another alternative embodiment of the compressor assembly 10 according to the invention is shown in FIGS. 18 to 20.

The embodiment in FIGS. 18 to 20 comprises the hub-side transmission component 34 shown in FIGS. 10 to 13. The beaded cylindrical cam 50 comprises a circular disk section 130 on its radially outer edge.

The rollers 86 of the actuatable contact elements 46 bear on the circular disk section 130 in FIG. 18. The compressor assembly 10 is in a freewheeling operating state in FIG. 18, because the rotational movement of the wheel mount-side transmission component 44 is not converted to an oscillating translatory movement of the hub-side transmission component 34 and the compressor component 38.

In order to switch the compressor assembly 10 from the freewheeling operating state in FIG. 18 to the functional operating state shown in FIG. 20, the pressure chambers 52 are subjected to the pressure medium. This results in a movement of the hub-side transmission components 34 that is directed radially inward. The spherical sections 86 allow for a movement of the hub-side transmission elements 34 away from the circular disk section 130 toward the beaded cylindrical cam 50. As is indicated by the arrow in FIG. 20, the rotational movement of the wheel mount-side transmission component 44 is then converted to an oscillating translatory movement 140 of the compressor component 38. The hub-side transmission component 34 is always in contact with the wheel mount-side transmission component 44 in this embodiment, but it only interacts therewith when it is pushed away from the circular disk section 130 toward the beaded cylindrical cam 50.

The hub-side transmission components 34 are pretensioned by a spring 150 such that the pressurization via the pressure chambers 52 results in a movement of the hub-side transmission components 34 directed radially inward. The movement only continues far enough that the hub-side transmission components 34 do not come in contact.

The precise radial position of the spherical section 86 is not set by this, such that a variable contact section 152 is obtained between the contact element 46 formed by the spherical section 86 and the beaded cylindrical cam 50.

Figure 21:
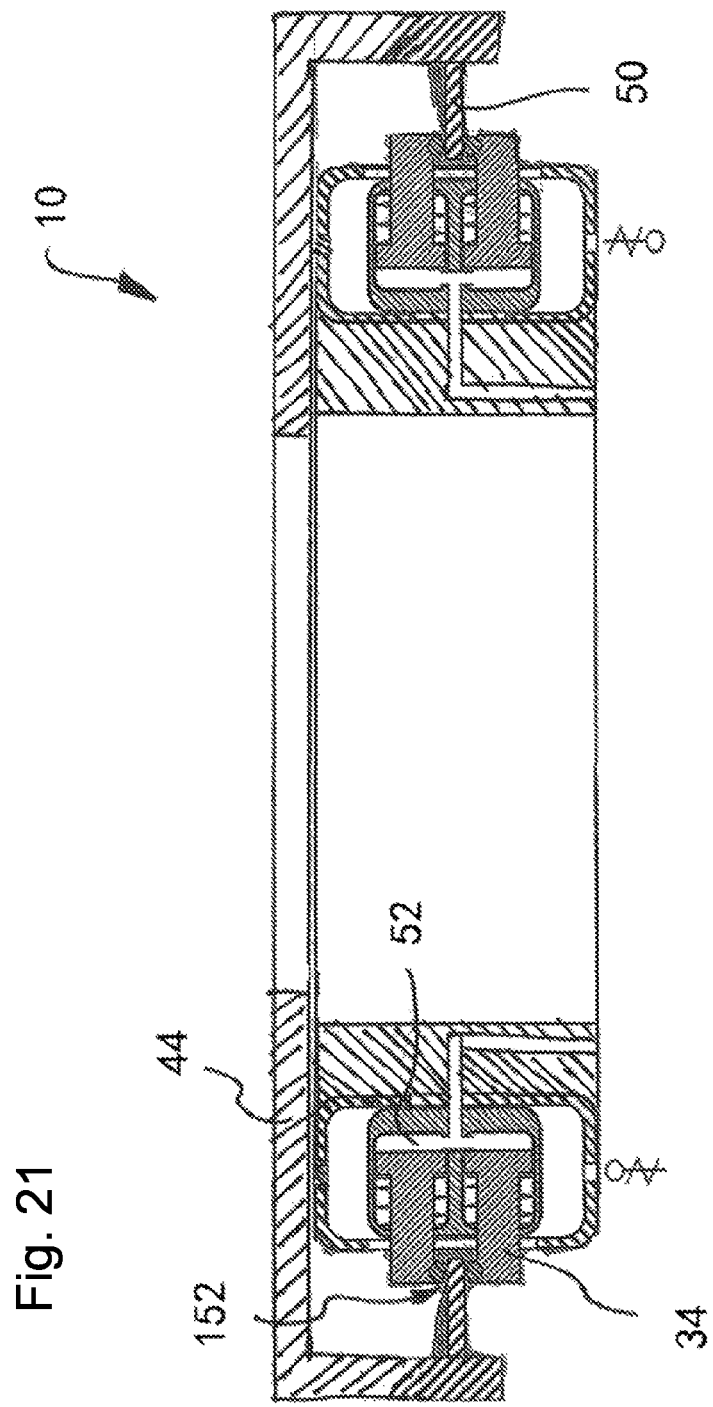
FIG. 21 shows compressor assembly, according to another embodiment of this invention.

FIG. 21 shows a compressor assembly 10 according to the invention in an alternative embodiment, which is similar to the embodiment in FIGS. 18 to 20, but in which the wheel mount-side transmission component 44 is located radially outward, and the hub-side transmission component 34 is located radially inward. The contact mechanism in the embodiment according to FIG. 21 also has a variable contact section 152 with the beaded cylindrical cam 50.

Figure 22:
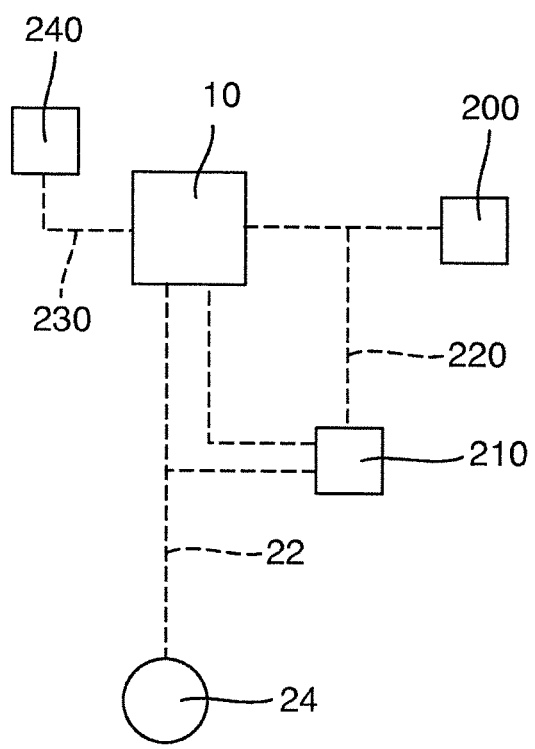
FIG. 22 shows an overview of an assembly for a control mechanism, according to one embodiment of this invention.

As FIG. 22 shows, the compressor assembly 10 can be connected to a filter 200, and a control mechanism 210. The filter 200 is preferably located where it establishes a fluid connection in front of the pressure medium intakes or air intakes of the compressor assembly 10.

The control mechanism 210 can detect when the filter 200 is clogged via a measurement connection 220. If the control mechanism detects that the filter 200 is clogged, the filter can be cleaned in that it is subjected to a pressure medium, or air, in the other direction. In the normal operation of the compressor assembly 10, air is conveyed through the filter 200 toward the compressor assembly 10, and from there to the tire cavity 24. In a cleaning procedure, a pressure medium, or air, is either let out of the tire cavity 24, and conveyed through the filter 200 in the other direction, or the compressor assembly 10 conveys a pressure medium toward the filter 200, instead of the tire cavity 24. For this, the compressor assembly 10 suctions in the pressure medium in via an additional intake 230, which has an additional air filter 240 that can be cleaned in a similar manner.

Advantageously, the control mechanism 210 can be used to measure and/or indicate the pressure, temperature, and/or moisture of pressure medium in the tire cavity 24, wherein these functions are independent of the other functions of the control mechanism 210.

Figure 23:
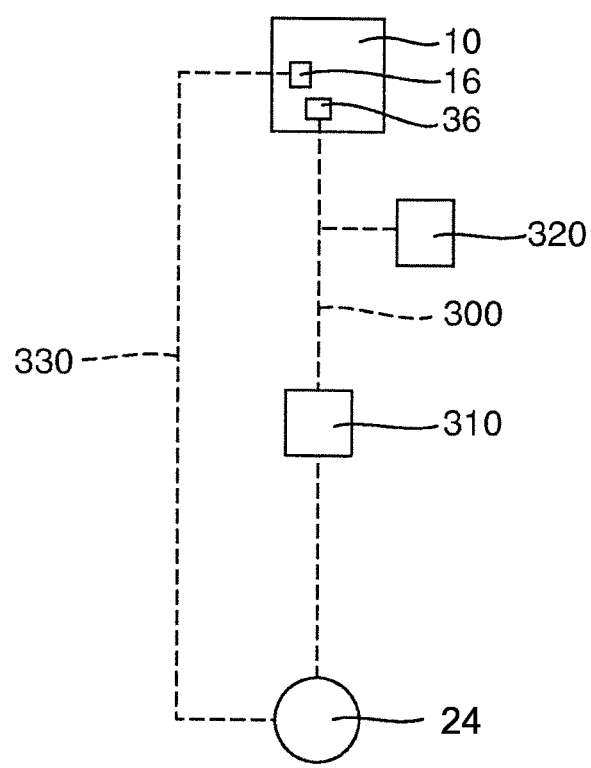
FIG. 23 shows an overview of an assembly for a coupling valve, according to one embodiment of this invention.

An exemplary variation of the control of the coupling mechanism 54 is illustrated in FIG. 23. The coupling mechanism 54 can also be actuated electrically, electromagnetically, or electromechanically. For this, electric energy can be conducted from the main battery of the vehicle or from a generator therein, or some other energy source, to the hub-side via sliding contacts.

It is also conceivable to place a generator on the hub, which acquires electric energy from the rotational relative movement between the hub and the wheel mount. It is likewise conceivable to place rechargeable batteries on the hub, in particular in the spokes of the rim 12.

The compressor assembly 10, in particular the coupling mechanism 54 thereof, is connected to the tire cavity 24 via a coupling pressure medium line 300. There is a coupling valve 310 located in the coupling pressure medium line 300. There is also a relief valve 320 located on the coupling pressure medium line 300. The compression chambers 40, 42 of the compressor assembly 10 are connected to the tire cavity 24 via a line 330 for conveying the pressure medium.

The pressure medium of the tire cavity 24 is subjected to a pressure in the tires at the coupling valve 310. When the tire pressure falls below a tire pressure threshold value, the coupling valve 310 opens, by means of which the coupling mechanism 54 is actuated by means of the pressure medium from the tire cavity 24, and the hub-side transmission component 34 interacts with the wheel mount-side transmission component 44.

When the vehicle is driven, a rotational relative movement takes place between the hub and the wheel mount, and the pressure medium is conveyed from the compression chambers 40, 42 to the tire cavity 24 via the line 330 for conveying the pressure medium.

The coupling mechanism 300 and the line 330 for conveying the pressure medium can also collectively form a single line.

When a tire pressure target value is exceeded, which is preferably higher than the tire pressure threshold value, the coupling valve 310 closes, such that the coupling mechanism 54 is no longer subjected to the pressure medium. When the tire pressure target value is exceeded, the air is bled out of the coupling mechanism 54 via the coupling valve 310 or the relief valve 320. In this manner, it is ensured that the compressor assembly 10 immediately shuts down as soon as the pressure medium target value has been reached in the tire cavity 24.

This manner of operating the coupling mechanism 54 can be combined with all of the embodiments and individual aspects of these embodiments of the compressor assembly 10 in this application.

The invention claimed is:

1. A compressor assembly (10) for supplying a pressure medium to a tire cavity (24) of a tire on a vehicle wheel mounted on a wheel hub (18), wherein the wheel hub (18) can be mounted on a wheel mount (16) such that it can rotate about an axis of rotation (29), the compressor assembly (10) comprising:
    at least one hub-side compression chamber (40, 42), a volume of which is altered by a translatory movement of a compressor component (36), wherein a pressure medium that is to be conducted into the tire cavity is pressurized by reducing the volume of the compression chamber (40, 42), and
    a transmission configured to convert a rotational movement between the wheel mount and the hub to an oscillating translatory movement of the compressor component (36) through an interaction of a wheel mount-side transmission component (44) with a hub-side transmission component (34), wherein: the wheel mount-side transmission component (44) comprises a beaded cylindrical cam (50), or the hub-side transmission component (34) comprises a beaded cylindrical cam (50);
    wherein the hub-side transmission component (34) comprises a contact mechanism (46, 48), wherein the contact mechanism (46, 48) has a contact element (46, 48) in front of and behind the beaded cylindrical cam (50) of the wheel mount-side transmission component (44), seen in the direction of the axis of rotation (29), configured to establish a contact with the beaded cylindrical cam (50) of the wheel mount-side transmission component (44).

2. The compressor assembly (10) according to claim 1, wherein the hub-side transmission component (34) comprises a tappet output drive (34).

3. A compressor assembly (10) for supplying a pressure medium to a tire cavity (24) of a tire on a vehicle wheel mounted on a wheel hub (18), wherein the wheel hub (18) can be mounted on a wheel mount (16) such that it can rotate about an axis of rotation (29), the compressor assembly (10) comprising:
- at least one hub-side compression chamber (40, 42), a volume of which is altered by a translatory movement of a compressor component (36), wherein a pressure medium that is to be conducted into the tire cavity is pressurized by reducing the volume of the compression chamber (40, 42),
- a transmission configured to convert a rotational movement between the wheel mount and the hub to an oscillating translatory movement of the compressor component (36) through an interaction of a wheel mount-side transmission component (44) with a hub-side transmission component (34), wherein: the wheel mount-side transmission component (44) comprises a beaded cylindrical cam (50), or the hub-side transmission component (34) comprises a beaded cylindrical cam (50),
- a shutter valve (95) located on the compressor component (36, 38), and
- a double ring seal (102) located on the compressor component (38, 36), bordering on a lubricant reservoir of the compressor component, and sealing the compression chamber against the compressor component, wherein the shutter valve (95) is formed as an integral part of at least a portion of the double ring seal (102).

4. The compressor assembly (10) according to claim 1, wherein the translatory movement of the compressor component (36, 38) takes place at least partially in the direction of the axis of rotation (29).

5. The compressor assembly (10) according to claim 1, wherein the hub-side transmission component (34) comprises a contact mechanism (46) with a contact element (46) in contact with the beaded cylindrical cam (50) along a variable contact section (152).

6. The compressor assembly (10) according to claim 1, wherein the compressor component (38) comprises an annular piston (36).

7. The compressor assembly (10) according to claim 1, wherein the hub-side compression chamber (40, 42) is located, seen along the axis of rotation (29), in front of and behind a contact section of the hub-side transmission component (34) including the cylindrical cam (52).

8. The compressor assembly (10) according to claim 1, wherein the wheel mount-side transmission component (44) is located radially inward of the hub-side transmission component (34).

9. The compressor assembly (10) according to claim 1, wherein the wheel mount-side transmission component (44) is located radially outward of the hub-side transmission component (34).

10. The compressor assembly (10) according to claim 1, wherein the wheel mount-side transmission component (44) comprises the beaded cylindrical cam (50) with a circular disk section (130).

11. The compressor assembly (10) according to claim 1, wherein the hub-side transmission component (34) comprises a roller tappet with a roller or a self-lubricating roller (120) including a lubricant reservoir (125).

12. The compressor assembly (10) according to claim 1, further comprising a shutter valve (95) located on the compressor component (36, 38).

13. The compressor assembly (10) according to claim 12, further comprising a double ring seal (102) located on the compressor component (38, 36), bordering on a lubricant reservoir of the compressor component, and sealing the compression chamber against the compressor component.

14. The compressor assembly (10) according to claim 3, wherein the hub-side transmission component (34) comprises a contact mechanism (46, 48), wherein the contact mechanism (46, 48) has a contact element (46, 48) in front of and behind the beaded cylindrical cam (50) of the wheel mount-side transmission component (44), seen in the direction of the axis of rotation (29), configured to establish a contact with the beaded cylindrical cam (50) of the wheel mount-side transmission component (44).

15. The compressor assembly (10) according to claim 1, further comprising a coupling mechanism (54) configured to bring the hub-side transmission component (34) into interaction with the wheel mount-side transmission component (44).

16. The compressor assembly (10) according to claim 15, wherein the coupling mechanism (54) is designed such that the hub-side transmission component (34) is pretensioned in a position in which the hub-side transmission component (34) does not interact with the wheel mount-side transmission component (44).

17. The compressor assembly (10) according to claim 15, wherein the coupling mechanism (54) is actuated pneumatically, magnetically, or electromagnetically.

18. The compressor assembly (10) according to claim 15, wherein the coupling mechanism (54) is actuated by the pressure medium in the tire cavity (24).

19. The compressor assembly (10) according to claim 15, further comprising a coupling valve (70, 310) configured to convey a fluid between the coupling mechanism (54) and the tire cavity (24), against which the pressure medium from the tire cavity (24) bears, and which opens when the tire pressure falls below a tire pressure threshold value to actuate the coupling mechanism (54) by the pressure medium from the tire cavity (24), and the hub-side transmission component (34) interacts with the wheel mount-side transmission component (44).

20. The compressor assembly (10) according to claim 19, wherein the coupling valve (70) closes when a tire pressure exceeds a tire pressure target value, which is higher than a tire pressure threshold value, by the coupling mechanism (54) being no longer subjected to the pressure medium, wherein the air is bled out of the coupling mechanism (54) by the coupling valve (70, 310) or a relief valve (74, 320) when the tire pressure exceeds the tire pressure target value.

21. The compressor assembly (10) according to claim 1, further comprising a measuring and/or indicating mechanism (210) connected to the tire cavity (24) by a pressure medium line (22), the mechanism (210) measuring and/or indicating a pressure, temperature, and/or moisture of the pressure medium in the tire cavity (24).

22. The compressor assembly (10) according to claim 1, further comprising a filter (200) at a pressure medium intake end.

23. The compressor assembly (10) according to claim 22, wherein the pressure medium, from the tire cavity (24) or by conveying the pressure medium through the compressor assembly (10), cleans the filter (200).

\* \* \* \* \*